(12) United States Patent
Trudeau et al.

(10) Patent No.: US 10,826,857 B2
(45) Date of Patent: Nov. 3, 2020

(54) MESSAGE PROCESSING FOR CLOUD COMPUTING APPLICATIONS

(71) Applicant: SAP SE, Walldorf (DE)

(72) Inventors: Christopher Trudeau, Kirkland, WA (US); John Dietz, Woodinville, WA (US); Amanda Casari, Duvall, WA (US); Richard Puckett, Seattle, WA (US)

(73) Assignee: SAP SE, Walldorf (DE)

( * ) Notice: Subject to any disclaimer, the term of this patent is extended or adjusted under 35 U.S.C. 154(b) by 328 days.

(21) Appl. No.: 15/789,928

(22) Filed: Oct. 20, 2017

(65) Prior Publication Data

US 2019/0124031 A1    Apr. 25, 2019

(51) Int. Cl.
*H04L 12/58* (2006.01)
*H04L 29/06* (2006.01)
(Continued)

(52) U.S. Cl.
CPC ............ *H04L 51/18* (2013.01); *G06F 16/173* (2019.01); *G06F 16/24522* (2019.01); *G06F 16/3329* (2019.01); *G06F 16/3337* (2019.01); *G06F 40/166* (2020.01); *G06F 40/263* (2020.01); *G06F 40/30* (2020.01); *H04L 12/2816* (2013.01); *H04L 63/00* (2013.01); *H04L 51/063* (2013.01); *H04L 67/02* (2013.01); *H04L 67/10* (2013.01); *H04L 67/1097* (2013.01)

(58) Field of Classification Search
CPC ............ H04L 12/2803; H04L 12/2816; H04L 12/2818; H04L 12/2823–2827; H04L 12/2836; H04L 51/00–04; H04L 51/046; H04L 51/063–066; H04L 51/18; H04L 65/00; H04L 67/10; G06F 3/167; G06F 16/243; G06F 16/24522; G06F 16/3337; G06F 16/3344; G06F 16/685; G06F 16/90332; G06F 17/275; G06F 17/28; G06F 17/2881–289; G06F 16/173; G06F 16/3329–3337; G06F 40/20; G06F 40/263; G10L 15/00–005; G10L 15/083–142; G10L 15/18–22; G05B 2219/35504; H04M 2242/12

See application file for complete search history.

(56) References Cited

U.S. PATENT DOCUMENTS 6,879,956 B1 *  4/2005  Honda ................... G10L 15/075
                                                                 704/244
8,407,303 B2 *  3/2013  Wong ...................... H04N 7/173
                                                                 709/203

(Continued)

*Primary Examiner* — Brendan Y Higa
(74) *Attorney, Agent, or Firm* — Fountainhead Law Group PC.

(57) ABSTRACT

Some embodiments provide a non-transitory machine-readable medium that stores a program. The program receives a message from a client device. The program further determines a language from a plurality of languages associated with the message. The program also determines a model from a plurality of models that corresponds to the determined language. Based on the determined model, the program further determines a function from a plurality of functions provided by a computing device that is associated with the message. The program also sends the computing device a request to perform the function.

20 Claims, 7 Drawing Sheets

(51) Int. Cl.

| | |
|---|---|
| *G06F 40/30* | (2020.01) |
| *G06F 40/166* | (2020.01) |
| *G06F 40/263* | (2020.01) |
| *H04L 12/28* | (2006.01) |
| *G06F 16/332* | (2019.01) |
| *G06F 16/2452* | (2019.01) |
| *H04L 29/08* | (2006.01) |
| *G06F 16/17* | (2019.01) |
| *G06F 16/33* | (2019.01) |

(56) References Cited

U.S. PATENT DOCUMENTS

| | | | |
|---|---|---|---|
| 9,418,658 B1* | 8/2016 | David | H04M 1/64 |
| 9,781,065 B2* | 10/2017 | Fu | H04W 4/12 |
| 10,033,674 B1* | 7/2018 | Maierean | H04M 7/0048 |
| 10,096,319 B1* | 10/2018 | Jin | G10L 25/63 |
| 10,388,282 B2* | 8/2019 | Chong | G10L 15/1822 |
| 10,418,026 B2* | 9/2019 | Des Jardins | G10L 15/005 |
| 10,592,523 B1* | 3/2020 | Ge | G06F 16/252 |
| 2002/0072914 A1* | 6/2002 | Alshawi | G06F 17/2827 |
| | | | 704/270.1 |
| 2002/0188435 A1* | 12/2002 | Labarge | G06F 17/289 |
| | | | 704/1 |
| 2004/0019643 A1* | 1/2004 | Zirnstein, Jr. | G06F 9/546 |
| | | | 709/206 |
| 2007/0167178 A1* | 7/2007 | Al-Harbi | G06Q 10/02 |
| | | | 455/466 |
| 2008/0162471 A1* | 7/2008 | Bernard | G06F 17/2785 |
| 2009/0125295 A1* | 5/2009 | Drewes | G06F 17/289 |
| | | | 704/3 |
| 2009/0271002 A1* | 10/2009 | Asofsky | G05B 15/02 |
| | | | 700/3 |
| 2010/0293230 A1* | 11/2010 | Lai | G06F 17/289 |
| | | | 709/206 |
| 2010/0332235 A1* | 12/2010 | David | G06F 16/3329 |
| | | | 704/275 |
| 2011/0137912 A1* | 6/2011 | Ragusa | G06F 16/313 |
| | | | 707/741 |
| 2011/0264440 A1* | 10/2011 | Zhou | G06F 40/58 |
| | | | 704/8 |
| 2012/0116748 A1* | 5/2012 | Kore | G06F 17/289 |
| | | | 704/2 |
| 2012/0166176 A1* | 6/2012 | Nakamura | G06F 17/289 |
| | | | 704/7 |
| 2012/0316860 A1* | 12/2012 | Reitan | G06F 17/289 |
| | | | 704/2 |
| 2013/0103384 A1* | 4/2013 | Hunter | G06F 17/28 |
| | | | 704/3 |
| 2014/0145962 A1* | 5/2014 | Radhakrishnan | G06F 3/04886 |
| | | | 345/171 |
| 2014/0278435 A1* | 9/2014 | Ganong, III | G10L 15/22 |
| | | | 704/275 |
| 2015/0026104 A1* | 1/2015 | Tambos | G06F 16/24 |
| | | | 706/12 |
| 2015/0243287 A1* | 8/2015 | Nakano | G10L 15/30 |
| | | | 704/246 |
| 2018/0063249 A1* | 3/2018 | Nguyen | H04L 67/125 |
| 2018/0092189 A1* | 3/2018 | Reier | H05B 37/0236 |
| 2018/0211650 A1* | 7/2018 | Knudson | G10L 15/183 |

* cited by examiner

| Function | Sequence |
|---|---|
| TripCount | how many trips do I have |
| TripCount | how many trips have I taken |
| TripCount | how many trips have I been on |
| TripCount | how many trips have I booked |
| TripSummary | details about my trip |
| TripSummary | details |
| TripSummary | give me a summary of my upcoming trip |
| TripSummary | details for my upcoming trip |
| TripSummary | my upcoming trip |
| Car | give me the details for my car rental |
| Car | my car rental |
| Car | details about my car |
| Car | car details |
| Car | what car did I book for my next trip |
| Flight | when is my departure flight |
| Flight | my departure flight |
| Flight | my departure flight details |
| Flight | departure flight |
| Flight | my next flight |
| Flight | next flight |
| Flight | what seat am I |

FIG. 2

MESSAGE PROCESSING FOR CLOUD COMPUTING APPLICATIONS

BACKGROUND

Today, software applications may be distributed in a number of different ways. For instance, a software application can be installed on a computing device and executed by the computing device. Such a software application may be referred to as standalone software applications. In some instances, a software application may be hosted on one or more computing devices (e.g., a cloud computing system) and accessed by client devices via networks (e.g., the Internet). Such a software application may be referred to as on-demand software. The method of distributing such a software application may be referred to as software as a service (SaaS). Many types of software applications are distributed using SaaS, such as messaging software, payroll processing software, database management system (DBMS) software, management software, computer-aided design (CAD) software, development software, accounting software, travel and expense management software, collaboration software, customer relationship management (CRM) software, enterprise resource planning (ERP) software, human resource management (HRM) software, content management (CM) software, etc.

SUMMARY

In some embodiments, a non-transitory machine-readable medium stores a program. The program receives a message from a client device. The program further determines a language from a plurality of languages associated with the message. The program also determines a model from a plurality of models that corresponds to the determined language. Based on the determined model, the program further determines a function from a plurality of functions provided by a computing device that is associated with the message. The program also sends the computing device a request to perform the function.

In some embodiments, the message may be a first message. The program may further receive a response to the request from the computing device. The program may also send the client device a second message that includes the response. The computing device may include an application. The plurality of functions may be provided by the application.

In some embodiments, each model in the plurality of models may include a set of mappings. Each mapping in the set of mappings may specify a function and a sequence of characters. The message may include a particular sequence of characters. Determining the function from the plurality of functions may include determining a mapping in the set of mappings of the model that specifies a sequence of characters that matches the particular sequence of characters of the message and identifying the function specified in the mapping as the determined function. Determining the function from the plurality of functions may further include removing punctuation from the particular sequence of characters of the message and converting the particular sequence of characters of the message to lowercase characters. Determining the function from the plurality of functions may further include sending a natural language processing system a request to determine the function from the plurality of functions. The message may include one or more of characters and graphical symbols.

In some embodiments, a method receives a message from a client device. The method further determines a language from a plurality of languages associated with the message. The method also determines a model from a plurality of models that corresponds to the determined language. Based on the determined model, the method further determines a function from a plurality of functions provided by a computing device that is associated with the message. The method also sends the computing device a request to perform the function.

In some embodiments, the message may be a first message. The method may further receive a response to the request from the computing device. The method may also send the client device a second message that includes the response. The computing device may include an application. The plurality of functions may be provided by the application.

In some embodiments, each model in the plurality of models may include a set of mappings. Each mapping in the set of mappings may specify a function and a sequence of characters. The message may include a particular sequence of characters. Determining the function from the plurality of functions may include determining a mapping in the set of mappings of the model that specifies a sequence of characters that matches the particular sequence of characters of the message and identifying the function specified in the mapping as the determined function. Determining the function from the plurality of functions may further removing punctuation from the particular sequence of characters of the message and converting the particular sequence of characters of the message to lowercase characters. Determining the function from the plurality of functions further may include sending a natural language processing system a request to determine the function from the plurality of functions. The message may include one or more of characters and graphical symbols.

In some embodiments, system includes a set of processing units and a non-transitory machine-readable medium that stores instructions. The instructions cause at least one processing unit to receive a message from a client device. The instructions further cause the at least one processing unit to determine a language from a plurality of languages associated with the message. The instructions also cause the at least one processing unit to determine a model from a plurality of models that corresponds to the determined language. Based on the determined model, the instructions further cause the at least one processing unit to determine a function from a plurality of functions provided by a computing device that is associated with the message. The instructions also cause the at least one processing unit to send the computing device a request to perform the function.

In some embodiments, the message may be a first message. The instructions may further cause the at least one processing unit to receive a response to the request from the computing device. The instructions may also cause the at least one processing unit to send the client device a second message that includes the response. The computing device may include an application. The plurality of functions may be provided by the application.

In some embodiments, each model in the plurality of models may include a set of mappings. Each mapping in the set of mappings may specify a function and a sequence of characters. The message may include a particular sequence of characters. Determining the function from the plurality of functions may include determining a mapping in the set of mappings of the model that specifies a sequence of characters that matches the particular sequence of characters of the message and identifying the function specified in the mapping as the determined function. Determining the function from the plurality of functions may further include removing punctuation from the particular sequence of characters of the message and converting the particular sequence of characters of the message to lowercase characters. Determining the function from the plurality of functions may further include sending a natural language processing system a request to determine the function from the plurality of functions.

The following detailed description and accompanying drawings provide a better understanding of the nature and advantages of the present invention.

BRIEF DESCRIPTION OF THE DRAWINGS

FIG. 2 illustrates an example language model according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for processing messages for cloud computing applications. In some embodiments, an application operates on a cloud computing system. The cloud computing system may receive a message from a client device. In some embodiments, the message includes a sequence of characters and/or graphical symbols (e.g., a string of characters, graphical symbols (e.g., emojis, smileys, etc.), etc., or a combination thereof). In response, the cloud computing system determines a language associated with the message (e.g., English, Japanese, Mandarin, Cantonese, Italian, French, Spanish, Greek, Arabic, etc.). Next, the cloud computing system determines a language model that corresponds to the language. Based on the determined language model, the cloud computing system determines a function provided by the application that is associated with the message. The cloud computing system then sends the application a request to perform the function. In response, the application may perform the function and then send the client device a response to the request.

Figure 1:
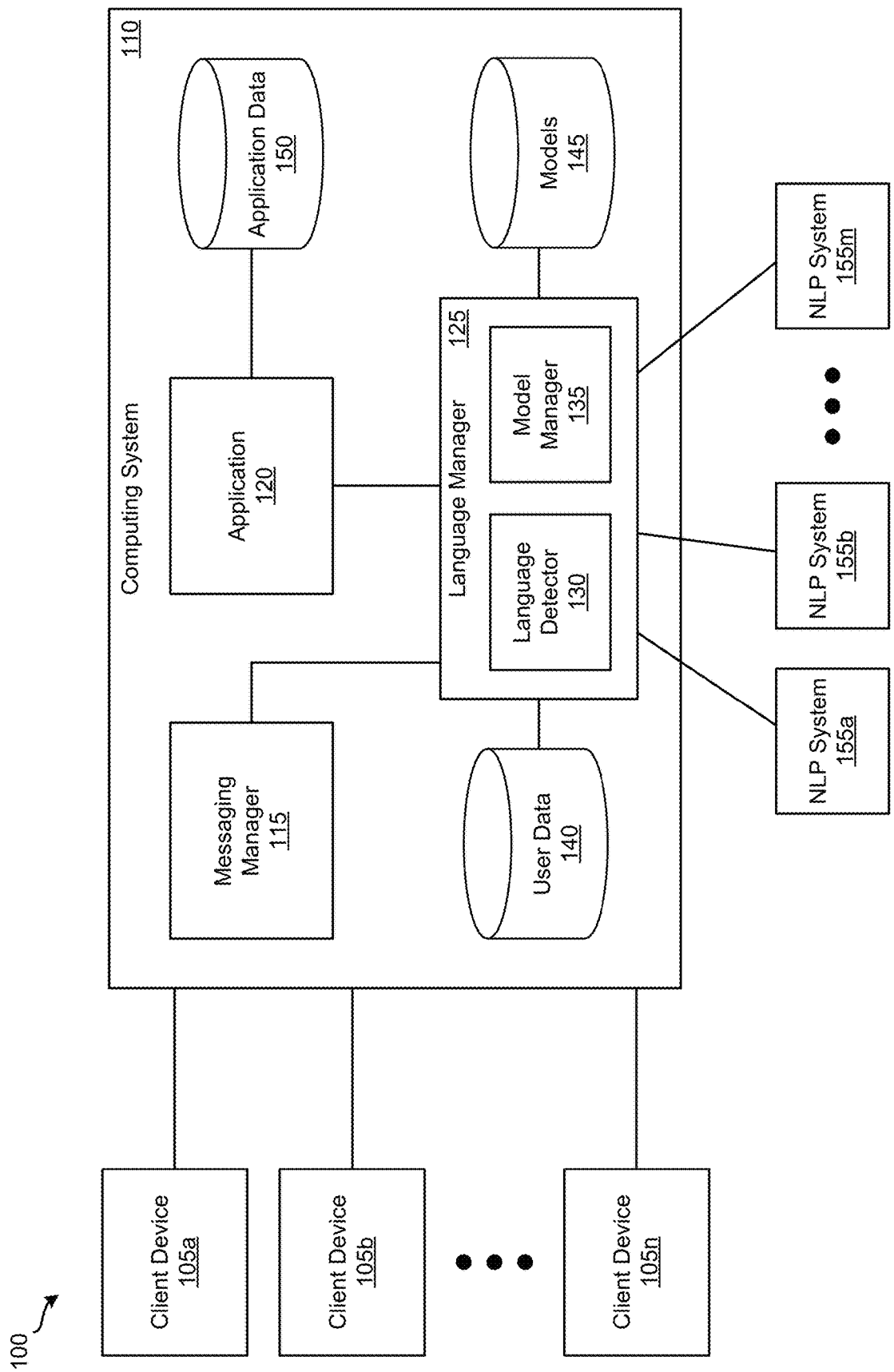
FIG. 1 illustrates a system for processing messages according to some embodiments.

FIG. 1 illustrates a system 100 for processing messages according to some embodiments. As shown, system 100 includes client devices 105*a-n*, computing system 110, and natural language processing (NLP) systems 150*a-m*. Client devices 105*a-n* are each configured to communicate and interact with computing system 110. In some embodiments, each of the client devices 105*a-n* includes a client messaging application configured to transmit messages to and receive messages from computing system 110. A user of a client device 105 may send computing system 110 a message in a particular language that requests a function potentially provided by application 120. In some embodiments, a message can include a user identifier (ID) of the sender of the message (e.g., the user ID associated with the user of the client device 105) and an ID of the recipient of the message (e.g., an ID associated with language manager 125). In response to the request, the client device 105 can receive output from the function or a list of functions provided by application 120 from which the user of the client device 105 may select. In some embodiments, client devices 105*a-n* may also access functions provided by application 120 via a web browser operating on client devices 105*a-n*.

NLP systems 150*a-m* may each be configured to determine functions provided by application 120 that are associated with messages. For instance, an NLP system 150 can receive from computing system 110 a message that computing system 110 received from a client device 105 along a request to determine a function provided by application 120 that is associated with the message. In some embodiments, one or more of NLP systems 150*a-m* are third-party NLP systems. FIG. 1 shows NLP systems 150*a-m* as external to computing system 110. One of ordinary skill in the art will understand that one or more of NLP systems 150*a-m* may be part of computing system 110 in some embodiments.

As shown in FIG. 1, computing system 110 includes messaging manager 115, application 120, language manager 125, and storages 140-150. In some embodiments, message manager 115, application 120, and language manager 125 are each implemented on a separate computing device. In other embodiments, several of message manager 115, application 120, and language manager 125 may be implemented on a single computing device. For example, message manager 115 may be implemented on a first computing device while application 120 and language manager 125 may be implemented on a second, different computing device. User data storage 140 is configured to store user data (e.g., user IDs) associated with users of client devices 105*a-n*. Models storage 145 is configured to store language models for different languages. Application data storage 150 stores data associated with application 120. For example, application data storage 150 may store data associated with users of application 150.

Messaging manager 115 handles communication of messages between client devices 105*a-n* and computing system 110. For example, messaging manager 115 can receive a message from a client device 105. As mentioned above, in some embodiments, a message can include a user ID of the sender of the message and an ID of the recipient of the message. If the ID of the recipient of the message is an ID associated with language manager 125, message manager 115 sends the message to language manager 125. Once language manager 125 processes the message, message manager 115 may receive a response to the message from language manager 125. Message manager 115 then sends the response to the client device 105.

Application 120 may be a software application operating on (e.g., hosted on) computing system 110 that may be accessed by client devices 105*a-n*. Application 115 may be any number of different types of applications. For instance, application 115 may be an analytics application, a data management application, a human capital management application, an enterprise management application, a customer relationship management application, a travel and expense management application, a financial management application, etc.

Application 120 is configured to provide a set of functions that are accessible by client devices 105a-n and language manager 125. The set of functions may include functions for accessing data (e.g., data associated with users of application 120) stored in application data storage 150, functions for storing data (e.g., data associated with users of application 120) in application data storage 150, functions for updating data (e.g., data associated with users of application 120) stored in application data storage 150, functions for deleting data (e.g., data associated with users of application 120) from application data storage 150, etc. In some embodiments, the set of functions are provided by application 120 through a set of application programming interfaces (APIs). Application 120 can receive from language manager 125 for a request to perform a function provided by application 120. In some embodiments, the request includes data associated with the function. For example, the request may be for a function that adds data associated with a particular user to application data storage 150. In such an example, the request includes the data associated with the particular user that is to be added to application data storage 150. In response to the request, application 120 performs the function and then sends a response to the request to language manager 125.

As illustrated in FIG. 1, language manager 125 includes language detector 130 and model manager 135. Language detector 130 is responsible for determining languages of messages. For example, language detector 130 can receive a message from messaging manager 115. Next, language detector 130 determines the language associated with the message. In some embodiments, language detector 130 determines the language associated with the message. In different embodiments, language detector 130 uses different techniques to determine the language associated with the message. For instance, in some embodiments, the message is encoded using a Unicode standard (e.g., UTF-8, UTF-16, UTF-32, etc.). In some such embodiments, language detector 130 uses heuristics based on the Unicode character set and n-grams (e.g., bigrams, trigrams, five-grams, etc.) in the message to detect the language associated with the message. Once language detector 130 determines the language associated with the message, language detector 130 sends the determined language and the message to model manager 135 for further processing.

Model manager 135 may determine functions provided by application 120 that are associated with messages. For example, model manager 135 may receive from language detector 130 a message and a language associated with the message. Model manager 135 accesses models storage 145 and identifies a language model based on the language associated with the message.

In some embodiments, a language model for a particular language includes mappings between a set of functions provided by application 120 and sequences of characters and/or graphical symbols. FIG. 2 illustrates an example language model 200 according to some embodiments. For this example, language model 200 is defined for the English language. In addition, the functions listed in language model 200 are provided by application 120. In particular, the functions include a TripCount function that provides a number of taken trips associated with a user, a TripSummary function that provides details of a next trip associated with a user, a Car function that provides details of a next car rental associated with a user, and a Flight function that provides details of a next flight associated with a user. As shown, language model 200 includes mappings 202-242 between these functions and different sequences. Specifically, language model 200 includes four mappings 202-208 between the TripCount function and four different sequences, five mappings 210-218 between the TripSummary function and five different sequences, five mappings 220-228 between the Car function and five different sequences, and seven mappings 230-242 between the Flight function and seven different sequences.

Returning to FIG. 1, after identifying a language model that corresponds to the language associated with the message, model manager 135 then determines an intended function based on the language model and the message. If model manager 135 is able to determine an intended function, model manager 135 sends application 120 a request to perform the function. In some embodiments, the request includes data associated with the function. For example, the request may be for a function that adds data associated with a particular user to application data storage 150. In such an example, the request includes the data associated with the particular user that is to be added to application data storage 150. In response to the request, application 120 performs the function and then sends a response to the request to language manager 125. Model manager 135 then sends the response to the request to the user of the client device 105 via message manager 115.

If model manager 135 cannot determine an intended function, model manager 135 sends an NLP system 155 a request to determine an intended function associated with the message. In response to such a request, model manager 135 may receive from the NLP system 155 an intended function and a confidence score associated with the intended function. If the confidence score is not below a defined threshold value, model manager 135 sends application 120 a request to perform the function. After application 120 performs the function, model manager 135 may receive a message that includes a response to the request. Model manager 135 sends message to the user of the client device 105 via message manager 115. If the confidence score that model manager 135 receives back from the NLP system 155 is below the defined threshold value, model manager 135 sends message manager 115 a response message that is destined for the sender of the original message. The response message includes a list of functions provided by application 120 and prompts the user of client device 105 to select function from the list of functions that the user of client device 105. When model manager 135 receives the selection of the function via message manager 115, model manager 135 updates the language model based on the selected function and the original message.

An example operation of system 100 will now be described by reference to FIG. 1. In particular, the example operation is a login operation. The login operation starts when a user of a client device 105 sends messaging manager 115 a message that includes a user ID associated with the user of the client device 105 as the sender of the message and an ID associated with language manager 125 as the recipient of the message. When message manager 115 receives the message, message manager 115 forwards it to language manager 125. Upon receiving the message, language manager 125 accesses user data storage 140 and checks whether the user ID included in the message is stored in user data storage 140. In this example, the user ID included in the message is not stored in user data storage 140. Thus, language manager 125 sends message manage 115 a message that includes an ID associated with language manager 125 as the sender of the message and a user ID associated with the user of the client device 105 as the recipient of the message. The message further includes a link (e.g., a uniform resource locator (URL)) for logging in to application 120. When message manager 115 receives the message from language manager 125, message manager 115 forwards it to the client device.

Next, the user of the client device 105 selects the link in the message, which causes application 120 to provide the client device 105 a login page of application 120. The user of the client device 105 provides login credentials (e.g., a username and a password) for an account associated with the user in the login page and sends the login credentials to application 120. Once application 120 verifies the login credentials are correct, application sends the user ID associated with the user and an access token to language manager 125. When language manager 125 receives the user ID and the access token, language manager 125 stores them in user data storage 140. Then, language manager 125 sends message manager 115 a message that includes an ID associated with language manager 125 as the sender of the message and a user ID associated with the user of the client device 105 as the recipient of the message. This message indicates that language manager 125 is ready to process messages from the user of the client device 105. After receiving the message, message manager 115 forwards it to the client device 105.

Figure 3:
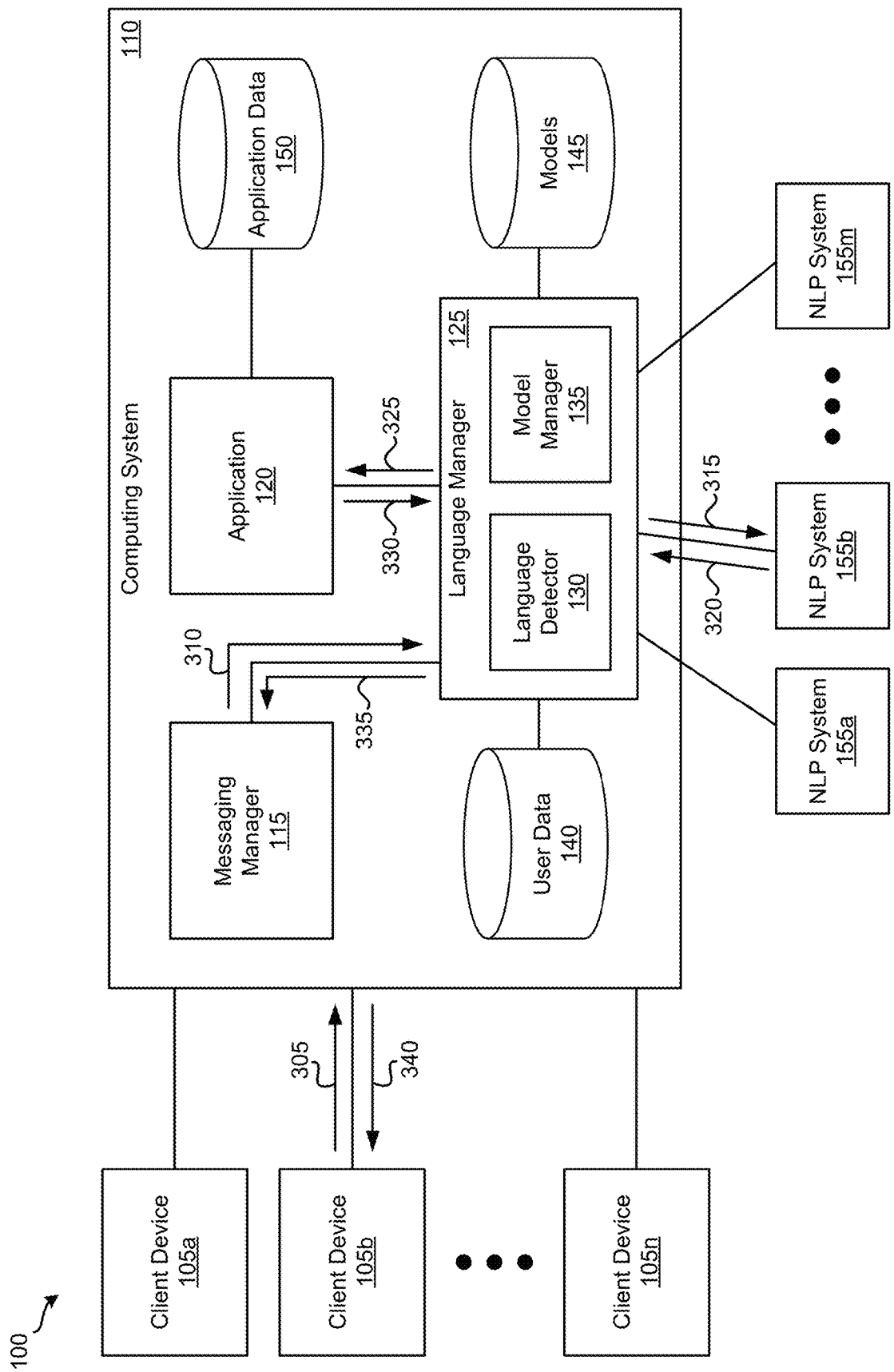
FIG. 3 illustrates an example dataflow through the system illustrated in FIG. 1 according to some embodiments.

Another example operation of system 100 will now be described by reference to FIG. 3. FIG. 3 illustrates an example dataflow 300 through system 100 according to some embodiments. Specifically, this example operation is a message processing operation. The example operation begins by a user of client device 105*b* sending, at 305, message manager 115 a message that includes a user ID associated with the user of client device 105*b* as the sender of the message and an ID associated with language manager 125 as the recipient of the message. The message also includes a sequence of characters and/or graphical symbols. For this example, the message includes the sequence of characters "Details about my trip." Upon receiving the message, message manager 115 forwards, at 310, it to language manager 125. Language manager 125 then accesses user data storage 140 and checks whether the user ID included in the message is stored in user data storage 140. For this example, the user ID included in the message is stored in user data storage 140.

Next, language detector 130 determines the language associated with the message. In this example, language detector 130 determines the language associated with the message is English. After language detector 130 determines the language associated with the message, language detector 130 sends the determined language and the message to model manager 135. When model manager 135 receives the message and the language associated with the message from language detector 130, model manager 135 accesses models storage 145 and identifies, based on the language associated with the message, a language model. For this example, model manager 135 identifies language model 200. Model manager 135 then determines an intended function associated with the message based on the language model and the message. In this example, model manager 135 determines an intended function associated with the message by removing punctuation from the message and converting the sequence of characters of the message to all lowercase characters, resulting in the following sequence of characters "details about my trip". Next, model manager 135 searches through language model 200 for a mapping that includes a sequence matching the processed sequence of characters of the message and identifies the function to which the matched sequence in language model 200 is mapped as the intended function associated with the message. For this example, model manager 135 searches through language model 200 and finds mapping 210 as mapping 210 includes a sequence that matches "details about my trip". "Model manager 135 then identifies TripSummary, the function to which the sequence" "details about my trip" is mapped in language model 200, as the intended function associated with the message.

In some instances, model manager 135 sends, at 315, an NLP system 155 a list of functions provided by application 120 along with a request to determine an intended function from the list of functions that is associated with the message when model manager 135 cannot determine an intended function associated with the message. In response to the request, the NLP system 155 determines an intended function associated with the message and a confidence score associated with the intended function and sends, at 320, them to language manager 125. If the confidence score is not below a defined threshold value, model manager 135 sends application 120 a request to perform the function. Once application 120 performs the function, model manager 135 may receive a message that includes a response to the request. Next, model manager 135 sends message to the user of the client device 105 via message manager 115. If the confidence score that model manager 135 receives back from the NLP system 155 is below the defined threshold value, model manager 135 sends message manager 115 a response message that is destined for the sender of the original message. The response message includes a list of functions provided by application 120 and prompts the user of client device 105 to select function from the list of functions that the user of client device 105. When model manager 135 receives the selection of the function via message manager 115, model manager 135 updates the language model based on the selected function and the original message. Referring to language model 200 as an example, model manager 135 can update language model 200 based on a selected function and an original message by adding a mapping to language model 200 that includes the selection function and the sequence of characters of the original message. In some embodiments, model manager 200 removes punctuation from the original message, converts the sequence of characters of the original message to all lowercase characters, and uses the processed sequence of characters of the original message as the sequence of the mapping added to language model 200.

As described above, in this example, model manager 135 is able to determine an intended function associated with the message. As such, model manager 135 sends, at 325, application 120 a request to perform the function. In response to the request, application 120 performs the function and then sends, at 330, a response to the request to language manager 125. In this example, application 120 performs the function TripSummary, which provides a summary of the most recent trip taken by a user associated with the user ID. Model manager 135 then sends, at 335, a message that includes an ID associated with language manager 125 as the sender of the message and a user ID associated with the user of client device 105*b* as the recipient of the message. The message also includes the response to the request (a summary of the most recent trip taken by a user associated with the user ID in this example). Upon receiving the message, message manager 115 forwards, at 340, it to client device 105*b* to present to the user of client device 105*b*.

Figure 4:
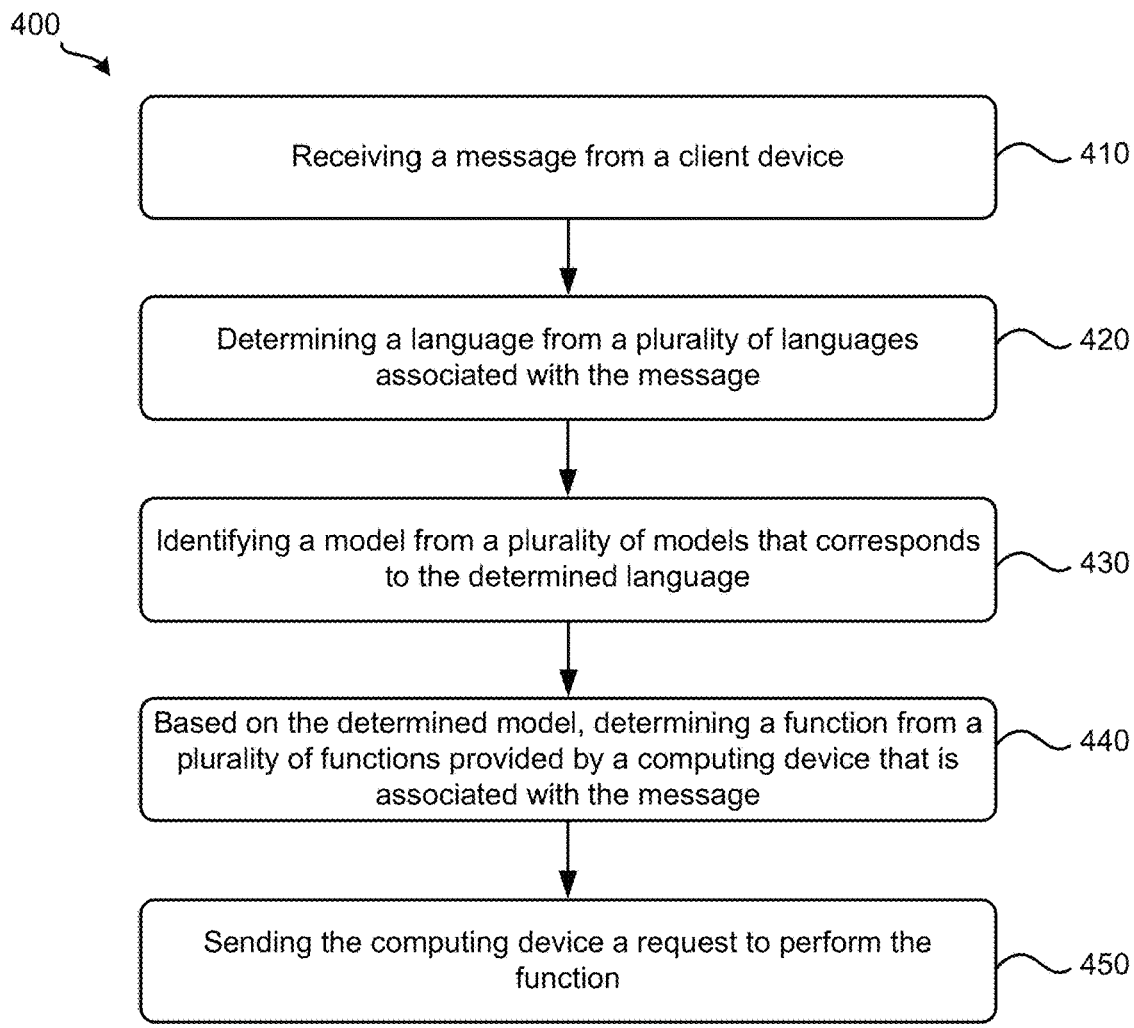
FIG. 4 illustrates a process for processing messages according to some embodiments.

FIG. 4 illustrates process 400 for processing messages according to some embodiments. In some embodiments, computing system 110 performs process 400. Process 400 starts by receiving, at 410, a message from a client device. Referring to FIG. 3 as an example, message manager 115 may receive a message from a user of client device 105b. Process 400 then determines, at 420, a language from a plurality of languages associated with the message. Referring to FIG. 3 as an example, message manager 115 sends the message to language manager 125, where language detector 130 determines the language associated with the message.

Next, process 400 identifies, at 430, a model from a plurality of models that corresponds to the determine language. Referring to FIG. 3 as an example, after language detector 130 determines the language associated with the message, model manager 135 accesses models storage 145 and identifies a language model based on the language associated with the message. Based on the determined model, process 400 then determines, at 440, a function from a plurality of functions provided by a computing device that is associated with the message. Referring to FIG. 3 as an example, model manager 135 may determine an intended function associated with the message and a confident score associated with the intended function based on the language model and the message.

Finally, process 400 sends, at 450, the computing device a request to perform the function. Referring to FIG. 3 as an example, model manager 135 sends application 120 a request to perform the function if model manager 135 is able to determine an intended function associated with the message. In response to the request, application 120 performs the function and then sends a response to the request to language manager 125. Model manager 135 then sends the response to the request to the user of the client device 105 via message manager 115.

Figure 5:
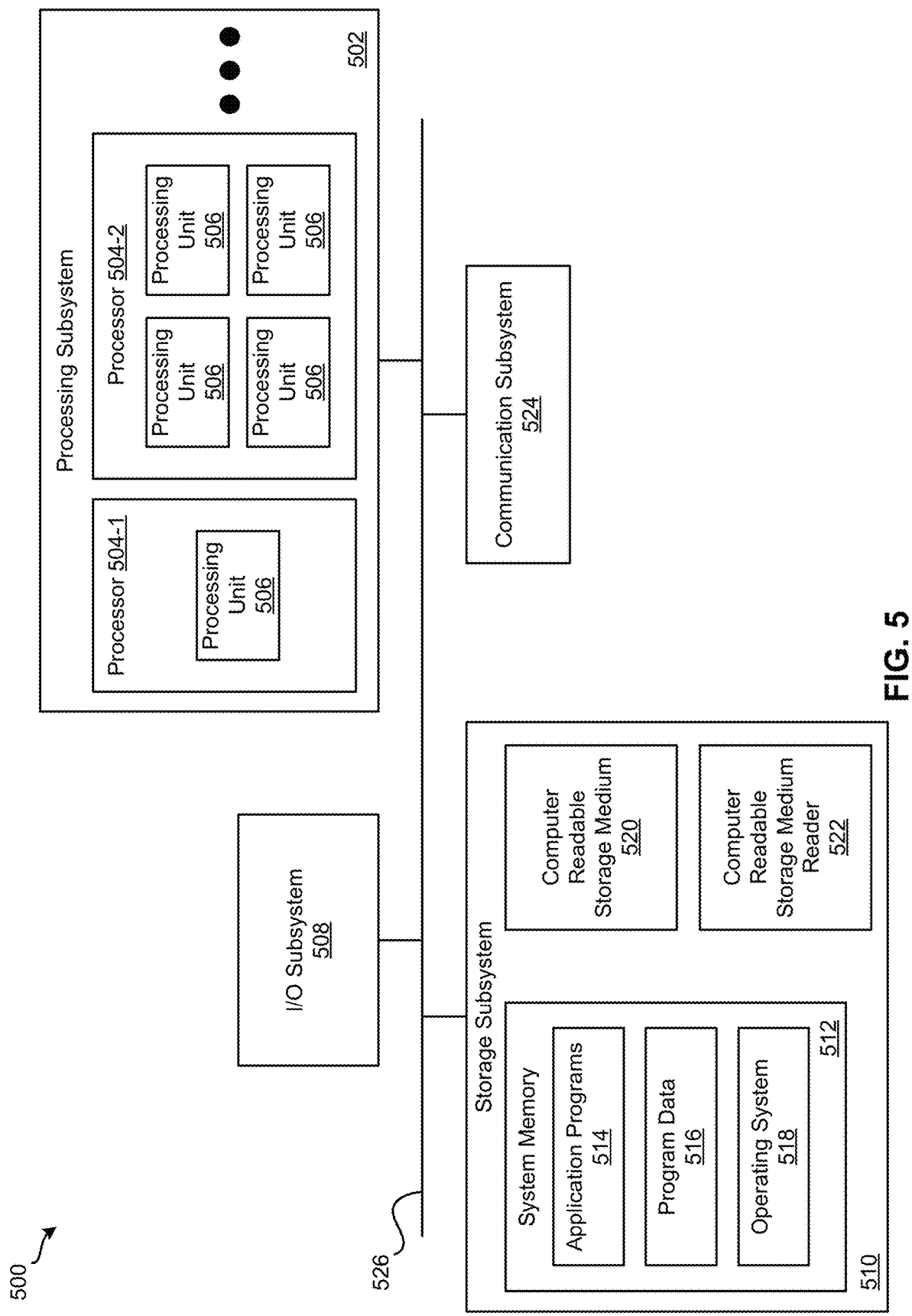
FIG. 5 illustrates an exemplary computer system, in which various embodiments may be implemented.

FIG. 5 illustrates an exemplary computer system 500 for implementing various embodiments described above. For example, computer system 500 may be used to implement client devices 105a-n and computing system 110. Computer system 500 may be a desktop computer, a laptop, a server computer, or any other type of computer system or combination thereof. Some or all elements of message manager 115, application 120, language manager 125, language detector 130, model manager 135, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 120), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., message manager 115, application 120, language manager 125, language detector 130, and model manager 135) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
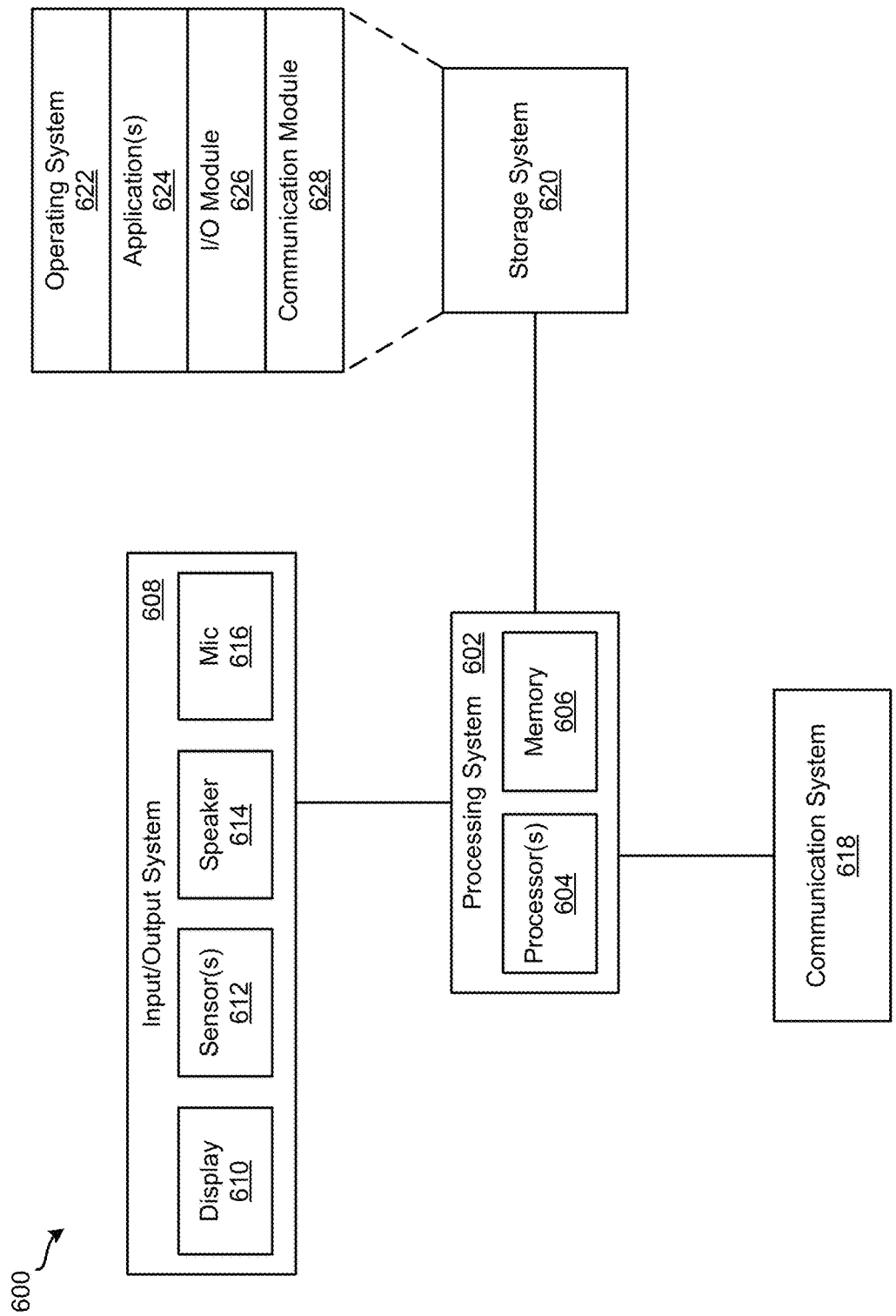
FIG. 6 illustrates an exemplary computing device, in which various embodiments may be implemented.

FIG. 6 illustrates an exemplary computing device 600 for implementing various embodiments described above. For example, computing device 600 may be used to implement client devices 105a-n. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI)

generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
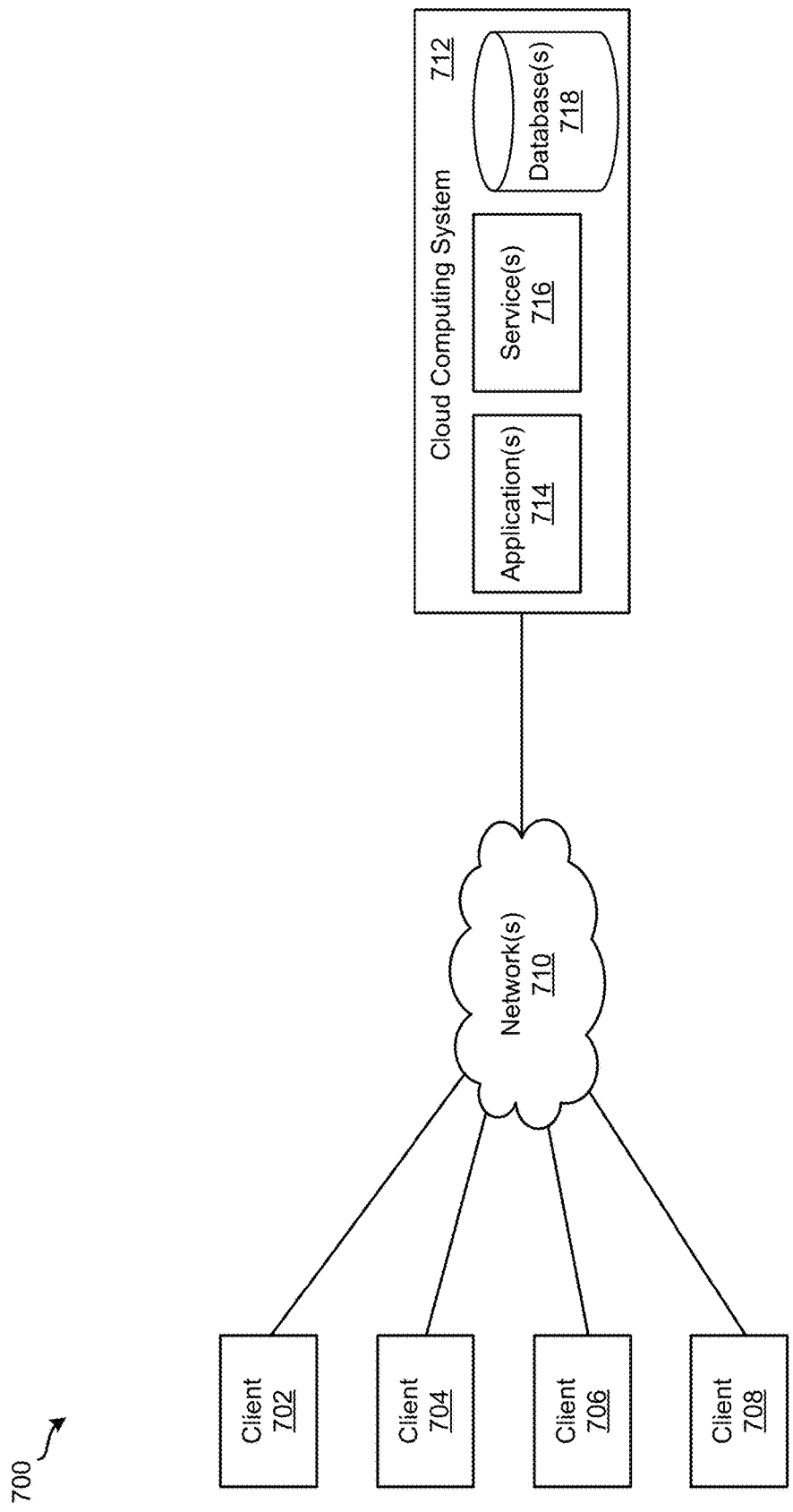
FIG. 7 illustrates system for implementing various embodiments described above.

FIG. 7 illustrates an exemplary system 700 for implementing various embodiments described above. For example, cloud computing system 712 of system 700 may be used to implement computing system 110 and client devices 702-708 may be used to implement client devices 105*a-n*. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 140-150 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving, from a user of a client device, a message comprising a particular sequence of characters;
   determining a language from a plurality of languages associated with the message based on the particular sequence of characters of the message;
   determining a model from a plurality of models that corresponds to the determined language;
   determining a function from a plurality of functions provided by a computing device that is associated with the message by providing the particular sequence of characters as input to the determined model and using a function output by the determined model as the determined function; and
   sending the computing device a request to perform the function.

2. The non-transitory machine-readable medium of claim 1, wherein the message is a first message, wherein the program further comprises sets of instructions for:
   receiving a response to the request from the computing device; and
   sending the client device a second message that includes the response.

3. The non-transitory machine-readable medium of claim 1, wherein the computing device comprises an application, wherein the plurality of functions is provided by the application.

4. The non-transitory machine-readable medium of claim 1, wherein each model in the plurality of models comprises a set of mappings, each mapping in the set of mappings specifying a function and a sequence of characters, wherein determining the function from the plurality of functions comprises:
   determining a mapping in the set of mappings of the model that specifies a sequence of characters that matches the particular sequence of characters of the message; and
   identifying the function specified in the mapping as the determined function.

5. The non-transitory machine-readable medium of claim 4, wherein determining the function from the plurality of functions further comprises:
   removing punctuation from the particular sequence of characters of the message; and
   converting the particular sequence of characters of the message to lowercase characters.

6. The non-transitory machine-readable medium of claim 1, wherein determining the function from the plurality of functions further comprises sending a natural language processing system a request to determine the function from the plurality of functions.

7. The non-transitory machine-readable medium of claim 1, wherein the message further includes one or more graphical symbols.

8. A method comprising:
receiving, from a user of a client device, a message comprising a particular sequence of characters;
determining a language from a plurality of languages associated with the message based on the particular sequence of characters of the message;
determining a model from a plurality of models that corresponds to the determined language;
determining a function from a plurality of functions provided by a computing device that is associated with the message by providing the particular sequence of characters as input to the determined model and using a function output by the determined model as the determined function; and
sending the computing device a request to perform the function.

9. The method of claim 8, wherein the message is a first message, wherein the method further comprises:
receiving a response to the request from the computing device; and
sending the client device a second message that includes the response.

10. The method of claim 8, wherein the computing device comprises an application, wherein the plurality of functions is provided by the application.

11. The method of claim 8, wherein each model in the plurality of models comprises a set of mappings, each mapping in the set of mappings specifying a function and a sequence of characters, wherein determining the function from the plurality of functions comprises:
determining a mapping in the set of mappings of the model that specifies a sequence of characters that matches the particular sequence of characters of the message; and
identifying the function specified in the mapping as the determined function.

12. The method of claim 11, wherein determining the function from the plurality of functions further comprises:
removing punctuation from the particular sequence of characters of the message; and
converting the particular sequence of characters of the message to lowercase characters.

13. The method of claim 8, wherein determining the function from the plurality of functions further comprises sending a natural language processing system a request to determine the function from the plurality of functions.

14. The method of claim 8, wherein the message further includes one or more graphical symbols.

15. A system comprising:
a set of processing units; and
a non-transitory machine-readable medium storing instructions that when executed by at least one processing unit in the set of processing units cause the at least one processing unit to:
receive, from a user of a client device, a message comprising a particular sequence of characters;
determine a language from a plurality of languages associated with the message based on the particular sequence of characters of the message;
determine a model from a plurality of models that corresponds to the determined language;
determine a function from a plurality of functions provided by a computing device that is associated with the message by providing the particular sequence of characters as input to the determined model and using a function output by the determined model as the determined function; and
send the computing device a request to perform the function.

16. The system of claim 15, wherein the message is a first message, wherein the instructions further cause the at least one processing unit to:
receive a response to the request from the computing device; and
send the client device a second message that includes the response.

17. The system of claim 15, wherein the computing device comprises an application, wherein the plurality of functions is provided by the application.

18. The system of claim 15, wherein each model in the plurality of models comprises a set of mappings, each mapping in the set of mappings specifying a function and a sequence of characters, wherein determining the function from the plurality of functions comprises:
determining a mapping in the set of mappings of the model that specifies a sequence of characters that matches the particular sequence of characters of the message; and
identifying the function specified in the mapping as the determined function.

19. The system of claim 18, wherein determining the function from the plurality of functions further comprises:
removing punctuation from the particular sequence of characters of the message; and
converting the particular sequence of characters of the message to lowercase characters.

20. The system of claim 15, wherein determining the function from the plurality of functions further comprises sending a natural language processing system a request to determine the function from the plurality of functions.

* * * * *